United States Patent
Kim

(10) Patent No.: US 12,118,838 B2
(45) Date of Patent: Oct. 15, 2024

(54) VEHICLE COOLING SYSTEM AND METHOD FOR DIAGNOSING ABNORMAL STATE THEREOF

(71) Applicants: HYUNDAI MOTOR COMPANY, Seoul (KR); KIA CORPORATION, Seoul (KR)

(72) Inventor: Yong Hyun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 192 days.

(21) Appl. No.: 17/672,931

(22) Filed: Feb. 16, 2022

(65) Prior Publication Data

US 2023/0117231 A1  Apr. 20, 2023

(30) Foreign Application Priority Data

Oct. 18, 2021 (KR) .................. 10-2021-0138721

(51) Int. Cl.
*G07C 5/08* (2006.01)
*B60K 11/02* (2006.01)

(52) U.S. Cl.
CPC ......... *G07C 5/0825* (2013.01); *G07C 5/0808* (2013.01); *B60K 11/02* (2013.01)

(58) Field of Classification Search
CPC .... G07C 5/0825; G07C 5/0808; B60K 11/02; B60K 2001/003; B60K 2001/005; F01P 11/16; F01P 7/04; F01P 11/029; F01P 2050/22; G05B 23/0235; F02D 41/22
See application file for complete search history.

(56) References Cited

U.S. PATENT DOCUMENTS

| | | | |
|---|---|---|---|
| 10,054,030 B2* | 8/2018 | Duan | F01P 7/165 |
| 10,774,728 B2* | 9/2020 | Yoon | G07C 5/0808 |
| 11,199,432 B2 | 12/2021 | Kwun | |
| 2013/0030643 A1* | 1/2013 | Nishizawa | F01P 5/10 |
| | | | 701/32.8 |
| 2017/0030274 A1* | 2/2017 | Nakanishi | F01P 7/16 |
| 2017/0350303 A1* | 12/2017 | Duan | F01P 7/165 |
| 2019/0390994 A1 | 12/2019 | Kwun | |

FOREIGN PATENT DOCUMENTS

| KR | 2020-0000204 A | 1/2020 |
|---|---|---|
| KR | 2020-0071903 A | 6/2020 |

* cited by examiner

*Primary Examiner* — Grant Moubry
(74) *Attorney, Agent, or Firm* — MCDONNELL BOEHNEN HULBERT & BERGHOFF LLP

(57) ABSTRACT

A method for diagnosing an abnormality of a vehicle cooling system using circulation of cooling water stored in a reservoir tank includes generating a diagnostic mode operation command based on state information of a vehicle including a disturbance factor, calculating an RPM of a water pump in response to the diagnostic mode operation command, and determining an abnormal state of the cooling system based on the RPM of the water pump being equal to or greater than a predetermined threshold.

18 Claims, 9 Drawing Sheets

VEHICLE COOLING SYSTEM AND METHOD FOR DIAGNOSING ABNORMAL STATE THEREOF

CROSS REFERENCE TO RELATED APPLICATIONS

This application claims the benefit of priority to Korean Patent Application No. 10-2021-0138721, filed in the Korean Intellectual Property Office on Oct. 18, 2021, the entire contents of which are incorporated herein by reference.

TECHNICAL FIELD

The present disclosure relates to a vehicle cooling system and a method for diagnosing an abnormal state thereof.

BACKGROUND

In an internal combustion engine-type vehicle, high heat is generated in surrounding parts, including an engine, by heat generated in a combustion process. A scheme of driving a motor based on electric energy as in an electric vehicle or a fuel cell electric vehicle generates the high heat in a charging device, a device requiring high power, and the like.

Therefore, the vehicle is equipped with a cooling system for cooling the devices where the high heat may be generated. As the vehicle cooling system, a water cooling scheme in which cooled cooling water is circulated may be used. When an amount and a flow rate of the cooling water are insufficient in the water cooling scheme, an abnormality of the cooling system may occur.

Although methods for diagnosing the abnormality of the cooling system and informing a user of the abnormality have been proposed, conventionally, additional sensors are often required. Accordingly, as a volume occupied by vehicle accessories increases, manufacturing cost increases.

SUMMARY

The present disclosure has been made to solve the above-mentioned problems occurring in the prior art while advantages achieved by the prior art are maintained intact.

An aspect of the present disclosure provides a vehicle cooling system and a method for diagnosing an abnormal state thereof that may reduce a volume of vehicle accessories.

In addition, another aspect of the present disclosure provides a vehicle cooling system and a method for diagnosing an abnormal state thereof that may reduce a manufacturing cost.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for diagnosing an abnormality of a vehicle cooling system using circulation of cooling water stored in a reservoir tank includes generating a diagnostic mode operation command based on state information of a vehicle including a disturbance factor, calculating an RPM of a water pump in response to the diagnostic mode operation command, and determining an abnormal state of the cooling system based on the RPM of the water pump being equal to or greater than a predetermined threshold.

In one implementation, the generating of the diagnostic mode operation command may include generating the diagnostic mode operation command based on identification of an on board charging system of the vehicle being in a charging state.

In one implementation, the generating of the diagnostic mode operation command may include generating the diagnostic mode operation command based on a temperature of an on board charging system of the vehicle being equal to or higher than a threshold temperature.

In one implementation, the generating of the diagnostic mode operation command may include generating the diagnostic mode operation command based on identification of a stationary state of the vehicle.

In one implementation, the generating of the diagnostic mode operation command may include generating the diagnostic mode operation command based on an inclination of the vehicle being smaller than a threshold angle.

In one implementation, the generating of the diagnostic mode operation command may include controlling a low voltage DC-DC converter of the vehicle to output a constant voltage during a period of calculating the RPM of the water pump.

In one implementation, the calculating of the RPM of the water pump may include calculating an average value of RPMs calculated for a preset certain period after the RPM of the water pump reaches a certain RPM.

In one implementation, the determining of the abnormal state of the cooling system may include determining that the cooling water of the reservoir tank is insufficient based on the RPM of the water pump being equal to or greater than a predetermined first threshold.

In one implementation, the determining of the abnormal state of the cooling system may include determining that the circulation of the cooling water from the reservoir tank is abnormal based on the RPM of the water pump being equal to or greater than a predetermined second threshold.

In one implementation, the method may further include displaying information on the abnormal state through a display after determining the abnormal state of the cooling system.

According to another aspect of the present disclosure, a vehicle cooling system includes a reservoir tank for storing cooling water, a water pump for circulating the cooling water, and a controller that generates a diagnostic mode operation command based on state information of a vehicle including a disturbance factor, calculates an RPM of the water pump in response to the diagnostic mode operation command, and determines an abnormal state based on the RPM of the water pump being equal to or greater than a predetermined threshold.

In one implementation, the controller may generate the diagnostic mode operation command based on identification of an on board charging system of the vehicle being in a charging state.

In one implementation, the controller may generate the diagnostic mode operation command based on a temperature of an on board charging system of the vehicle being equal to or higher than a threshold temperature.

In one implementation, the controller may generate the diagnostic mode operation command based on identification of a stationary state of the vehicle.

In one implementation, the controller may generate the diagnostic mode operation command based on an inclination of the vehicle being smaller than a threshold angle.

In one implementation, the controller may control a low voltage DC-DC converter of the vehicle to output a constant voltage during a period of calculating the RPM of the water pump.

In one implementation, the controller may determine that the cooling water of the reservoir tank is insufficient based on the RPM of the water pump being equal to or greater than a predetermined first threshold.

In one implementation, the controller may determine that the circulation of the cooling water from the reservoir tank is abnormal based on the RPM of the water pump being equal to or greater than a predetermined second threshold.

In one implementation, the controller may control a display to inform information on the abnormal state through the display after determining the abnormal state of the cooling system.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
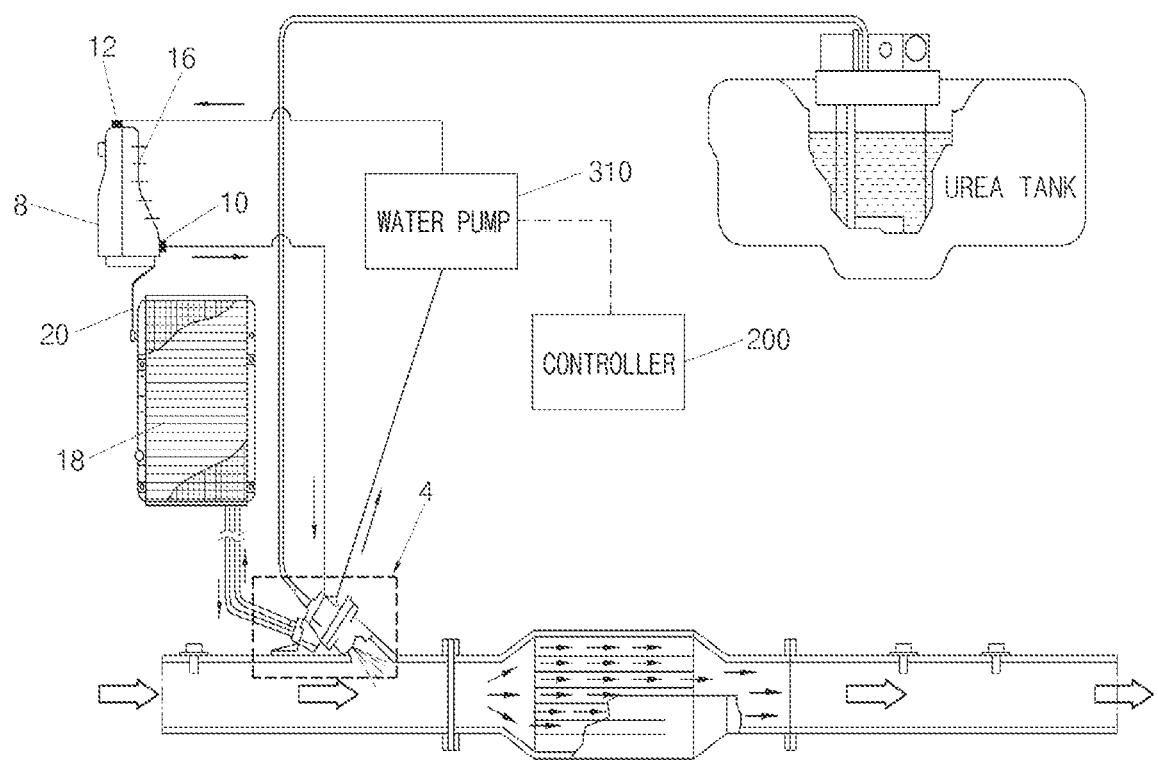
FIG. 1 is a diagram showing a vehicle cooling system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 9.

FIG. 1 is a diagram showing a vehicle cooling system according to an embodiment of the present disclosure.

Referring to FIG. 1, a vehicle cooling system according to an embodiment of the present disclosure may include a dosing injector 4, a reservoir tank 8, a water pump 310, and a controller 200.

The dosing injector 4 may be cooled by receiving cooling water from the reservoir tank 8. The cooling water discharged through a supply portion 10 of the reservoir tank 8 may be introduced into an inlet portion 12 of the reservoir tank 8 via the dosing injector 4.

The reservoir tank 8 may be connected to an overflow pipe 20 on a side surface of a radiator 18 located in an engine room, and may be cooled by travel wind of a vehicle flowing into the engine room. A heat dissipation fin 16 of the reservoir tank 8 may increase a cooling effect of the reservoir tank 8 by expanding an area in contact with the travel wind of the vehicle.

The water pump 310 may circulate the cooling water to be introduced into the inlet portion 12 via the dosing injector 4 from the supply portion 10 of the reservoir tank 8.

The controller 200 may generate a diagnostic mode operation command based on vehicle state information, and determine an RPM of the water pump 310 based on the diagnostic mode operation command. The controller 200 may determine whether an amount of cooling water stored in the reservoir tank 8 is insufficient based on the RPM of the water pump 310, or may determine that a cooling water circulation path is abnormal.

Figure 2:
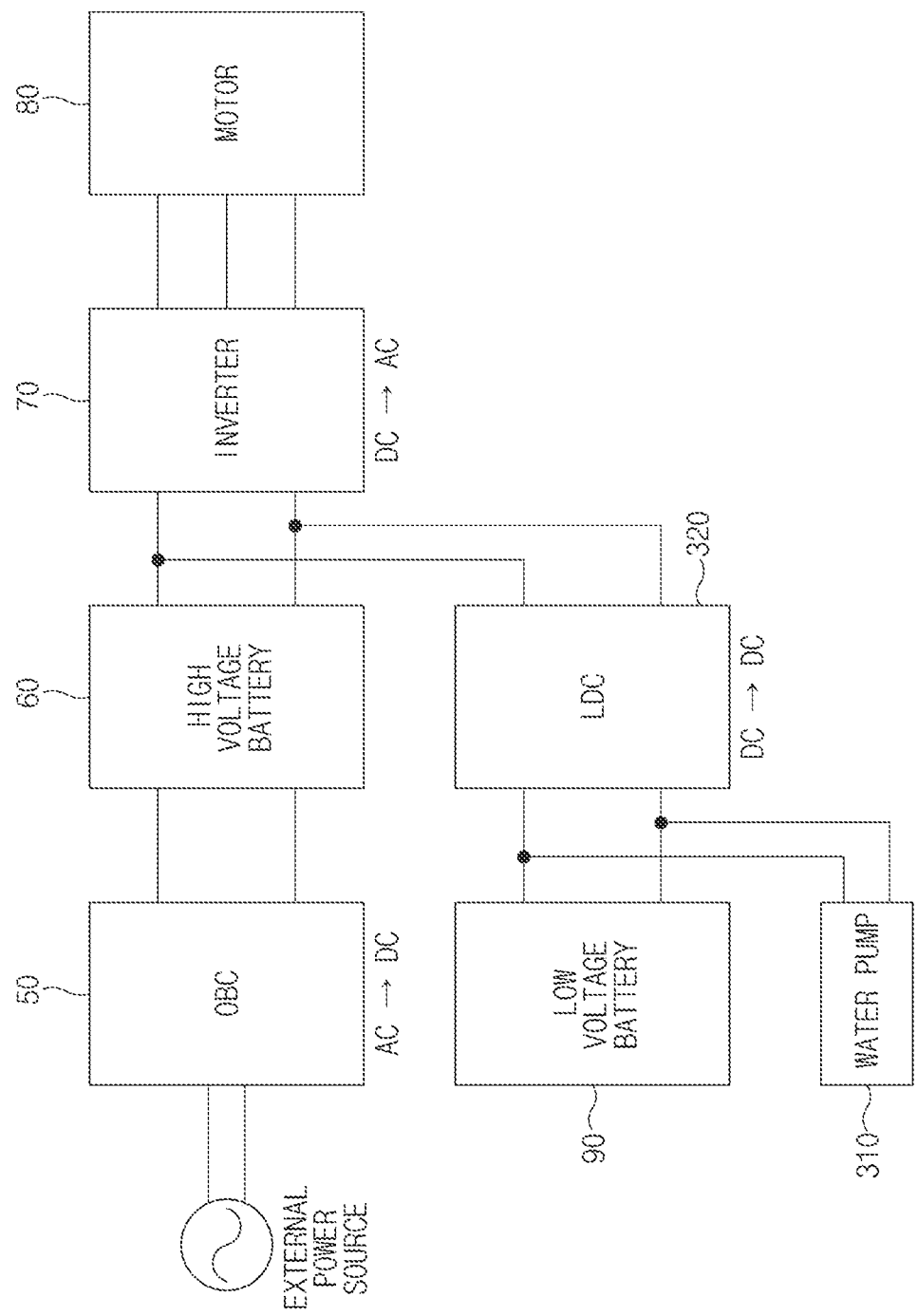
FIG. 2 is a diagram showing a configuration of a power change system in a vehicle that provides power for driving a water pump.

FIG. 2 is a diagram showing a configuration of a power change system in a vehicle that provides power for driving a water pump.

Referring to FIG. 2, the power change system may include an on board charger 50, a high voltage battery 60, an inverter 70, a low voltage DC-DC converter 320, and a low voltage battery 90.

The on board charger (hereinafter, OBC) 50 may boost alternating current (AC) power from an external power source, and convert the AC power to a direct current (DC) power.

The high voltage battery 60 may be charged by the OBC 50, and may provide power for driving a motor 80.

The inverter 70 may convert a DC voltage provided from the high voltage battery 60 into an AC voltage, and provide the converted AC voltage to the motor 80.

The low voltage DC-DC converter (LDC) 320 may charge the low voltage battery 90 and may provide power to electronic devices in the vehicle driven at 12 V. In addition, the low voltage DC-DC converter 320 may provide a voltage for driving the water pump 310 of the cooling system.

The low voltage battery 90 may provide the power to the electronic devices in the vehicle driven at 12 V in the vehicle.

Figure 3:
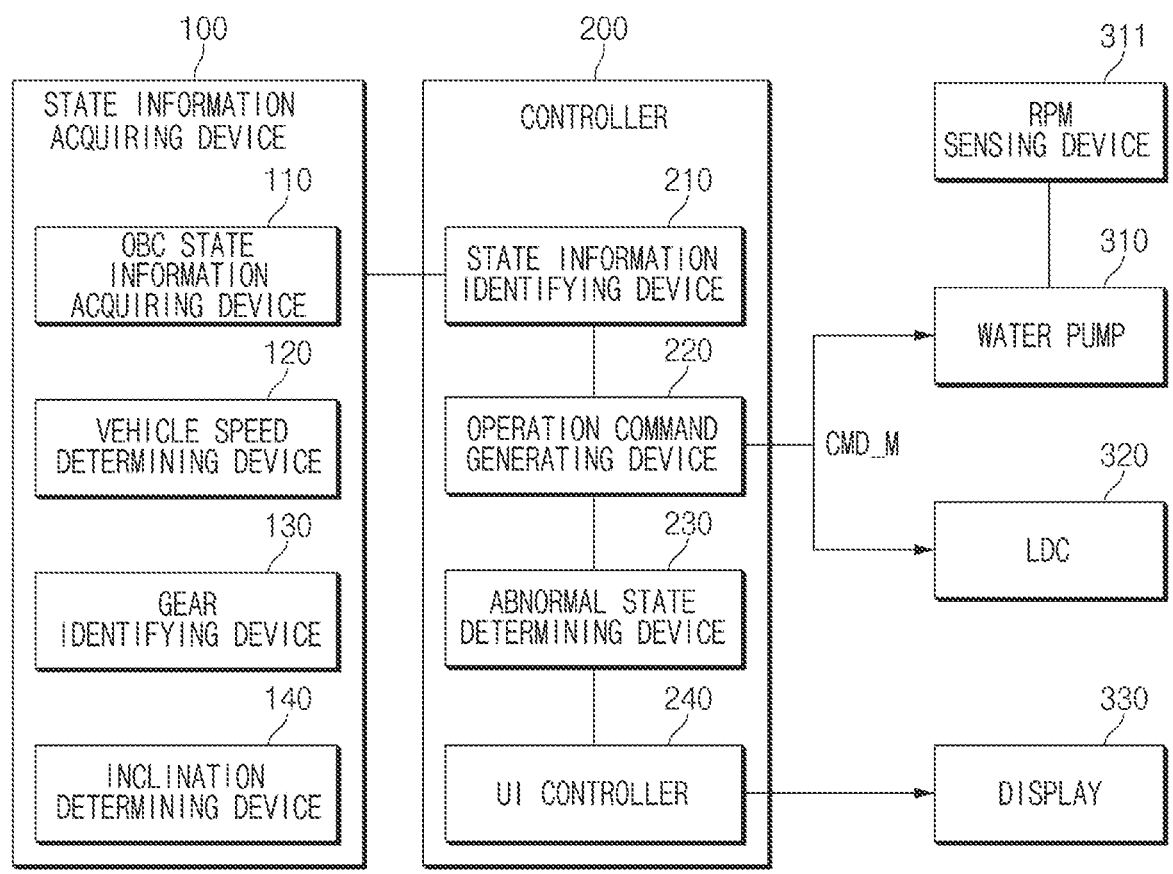
FIG. 3 is a block diagram showing a configuration for diagnosing an abnormal state of a vehicle cooling system according to an embodiment of the present disclosure.

FIG. 3 is a block diagram showing a configuration for diagnosing an abnormal state of a vehicle cooling system according to an embodiment of the present disclosure.

Referring to FIG. 3, a device for diagnosing the abnormal state of the vehicle cooling system according to an embodiment of the present disclosure may include a state information acquiring device 100 and the controller 200.

The controller 200 may generate a diagnostic mode operation command (CMDM) based on the state information of the vehicle provided from the state information acquiring device 100, and determine whether the cooling system is abnormal based on the RPM of the water pump 310 calculated in response to the diagnostic mode operation command. When whether the cooling system is abnormal is detected, the controller 200 may notify the abnormal state of the cooling system through a display 330.

The state information acquiring device 100 may acquire the state information of the vehicle. The state information of the vehicle may be information for determining a disturbance factor affecting the RPM of the water pump 310 among external factors of the vehicle cooling system. The state information acquiring device 100 may be a sensor that senses a physical quantity for determining the disturbance factor. In addition, the state information acquiring device 100 may determine the disturbance factor based on the sensed physical quantity, and may provide the sensed physical quantity to the controller 200 such that the controller 200 determines the disturbance factor. For example, the disturbance factor may be an input voltage of the water pump 310, a control duty of the water pump 310, a vehicle deviation, a unit deviation, durability deterioration, a cooling water temperature, a cooling water amount, an inclination angle sensor error, and the like.

The state information acquiring device 100 may include an OBC state information acquiring device 110, a vehicle speed determining device 120, a gear identifying device 130, and an inclination determining device 140.

The OBC state information acquiring device 110 may acquire charging state information of the vehicle. The charging state information of the vehicle may include information indicating whether the vehicle is in a state of being charged or in a utility mode state. The state in which the vehicle is being charged may refer to a state in which a fuel cell stack of the vehicle is charged by the power from the external power source. The utility mode may refer to a state in which an external electronic device is charged using a battery of the vehicle.

The vehicle speed determining device 120 may determine a speed of the vehicle. The vehicle speed determining device 120 may be a sensor for sensing the physical quantity capable of determining the speed of the vehicle, and may include logic for calculating the speed of the vehicle based on the physical quantity obtained from the sensor. For example, the vehicle speed determining device 120 may be a sensing device for sensing a rotational speed of a wheel, and may include logic for determining the speed of the vehicle from the rotational speed of the wheel.

The gear identifying device 130 may identify a gear state of the vehicle.

The inclination determining device 140 may obtain an inclination of the vehicle. The inclination of the vehicle may refer to an angle between the ground and a straight line belonging to a bottom surface of the vehicle. To this end, the inclination determining device 140 may include a 3-axis acceleration sensor. In addition, the inclination determining device 140 may acquire the inclination of the vehicle based on an acceleration in 3-axis directions obtained from the 3-axis acceleration sensor.

The controller 200 may include a state information identifying device 210, an operation command generating device 220, an abnormal state determining device 230, and a user interface (hereinafter, UI) controller 240.

The state information identifying device 210 may determine the disturbance factor based on the physical quantity provided from the state information acquiring device 100, or receive information on the disturbance factor from the state information acquiring device 100.

When the vehicle is in the state of being charged or the vehicle is in the utility mode state based on the charging state information of the vehicle, the state information identifying device 210 may determine that the disturbance factor is excluded. In addition, when the vehicle is in a stationary state or a gear position is a "P stage", the state information identifying device 210 may determine that the disturbance factor is excluded. In addition, when the inclination of the vehicle is smaller than a threshold angle, the state information identifying device 210 may determine that the disturbance factor is excluded.

The operation command generating device 220 may generate the diagnostic mode operation command based on the determination that there is no disturbance factor by the state information identifying device 210. The diagnostic mode operation command may provide a constant input to cause the water pump 310 to rotate at a target RPM. That is, the water pump 310 may perform open loop control by the diagnostic mode operation command.

In addition, the operation command generating device 220 may adjust an input voltage and a duty ratio of the low voltage DC-DC converter 320 such that the low voltage DC-DC converter 320 for providing the voltage to the water pump 310 outputs a constant voltage.

The operation command generating device 220 may control the water pump 310 in an open loop form, and control the low voltage DC-DC converter to output the constant voltage, thereby removing the disturbance factor that may intervene in the process of calculating the RPM of the water pump 310.

The abnormal state determining device 230 may determine the abnormal state of the cooling system based on comparison of the RPM of the water pump 310 with a predetermined threshold. The critical value may vary depending on the abnormal state of the cooling system to be determined. For example, as an embodiment, a first critical value may be set to the RPM of the water pump, which is a criterion for determining shortage of the cooling water in the reservoir tank 8. As another embodiment, a second critical value may be set to the RPM of the water pump, which is a criterion for determining that circulation of the cooling water from the reservoir tank 8 is abnormal.

The UI controller 200 may control a UI to inform a user of abnormality information when it is determined that the cooling system is abnormal.

Figure 4:
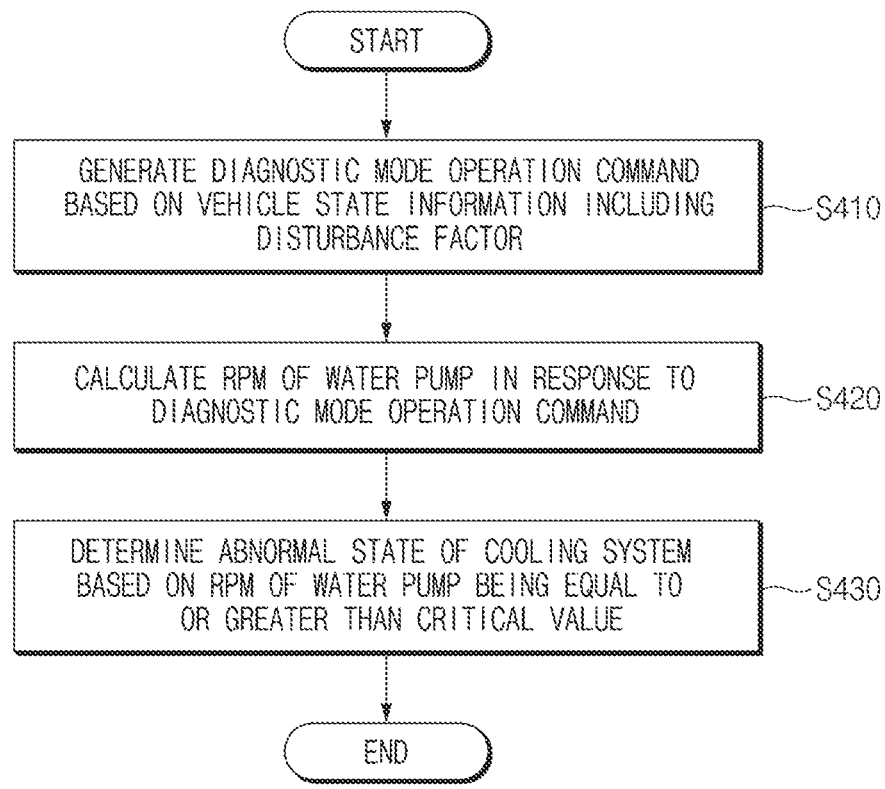
FIG. 4 is a flowchart showing a vehicle cooling system diagnosis method according to an embodiment of the present disclosure.

FIG. 4 is a flowchart showing a vehicle cooling system diagnosis method according to an embodiment of the present disclosure. Procedures shown in FIG. 4 may be performed by the controller 200 shown in FIG. 3.

Referring to FIG. 4, in the vehicle cooling system diagnosis method according to the embodiment of the present disclosure, in a first operation at S410, the controller 200 may generate the diagnostic mode operation command based on the determination of the state in which the disturbance factor is excluded.

Through first operation S410, the controller 200 may determine whether a ready state in which a diagnostic mode operation is performed is activated.

In addition, because the state in which the disturbance factor is excluded is primarily identified before performing the diagnostic mode operation, it is possible to prevent in advance a phenomenon in which the RPM of the water pump 310 changes by the external factors of the cooling system.

In a second operation at S420, the controller 200 may calculate the RPM of the water pump 310 in response to the diagnostic mode operation command.

The controller 200 may calculate the RPM of the water pump 310 after a certain time has elapsed from a timing at which the diagnostic mode operation command is generated. An RPM sensing device 311 may sense an RPM of a motor of the water pump 310, and the controller 200 may receive RPM information from the RPM sensing device 311. In addition, the controller 200 may calculate an average value of the RPMs of the motor provided for a certain period as the RPM of the water pump 310.

In a third operation at S430, the controller 200 may determine the abnormal state of the cooling system based on the RPM of the water pump being equal to or greater than the predetermined threshold.

Because the RPM of the water pump 310 is inversely proportional to a flow rate of the cooling water, the flow rate of the cooling water may be estimated based on the RPM of the water pump 310. This is because the lower the flow rate of the cooling water, the smaller the load of the water pump 310, and the greater the RPM of the water pump 310. Because the flow rate of the cooling water varies depending on the amount of cooling water stored in the reservoir tank 8 and a circulation state of the cooling water, it is possible to determine the amount of cooling water and the circulation state of the cooling water based on the RPM of the water pump 310.

The critical value may vary depending on the abnormal state of the cooling system to be determined. For example, as an embodiment, the first critical value may be set to the RPM of the water pump, which is the criterion for determining the shortage of the cooling water in the reservoir tank 8. As another embodiment, the second critical value may be set to the RPM of the water pump, which is the criterion for determining that the circulation of the cooling water from the reservoir tank 8 is abnormal.

As such, according to the embodiment of the present disclosure, it is possible to determine the abnormal state in the circulation of the cooling water without using a flow rate sensor. In addition, according to the embodiment of the present disclosure, it is possible to determine the cooling water shortage state without using a water level sensor. That is, according to the embodiment of the present disclosure, it is possible to determine the abnormal state of the cooling system using the information acquired from the state information acquiring device 100 corresponding to an accessory belonging to an existing vehicle.

When it is determined in third operation S430 that the cooling system is in the abnormal state, the controller 200 may inform the user of the abnormal state of the cooling system through the display 330.

Figure 5:
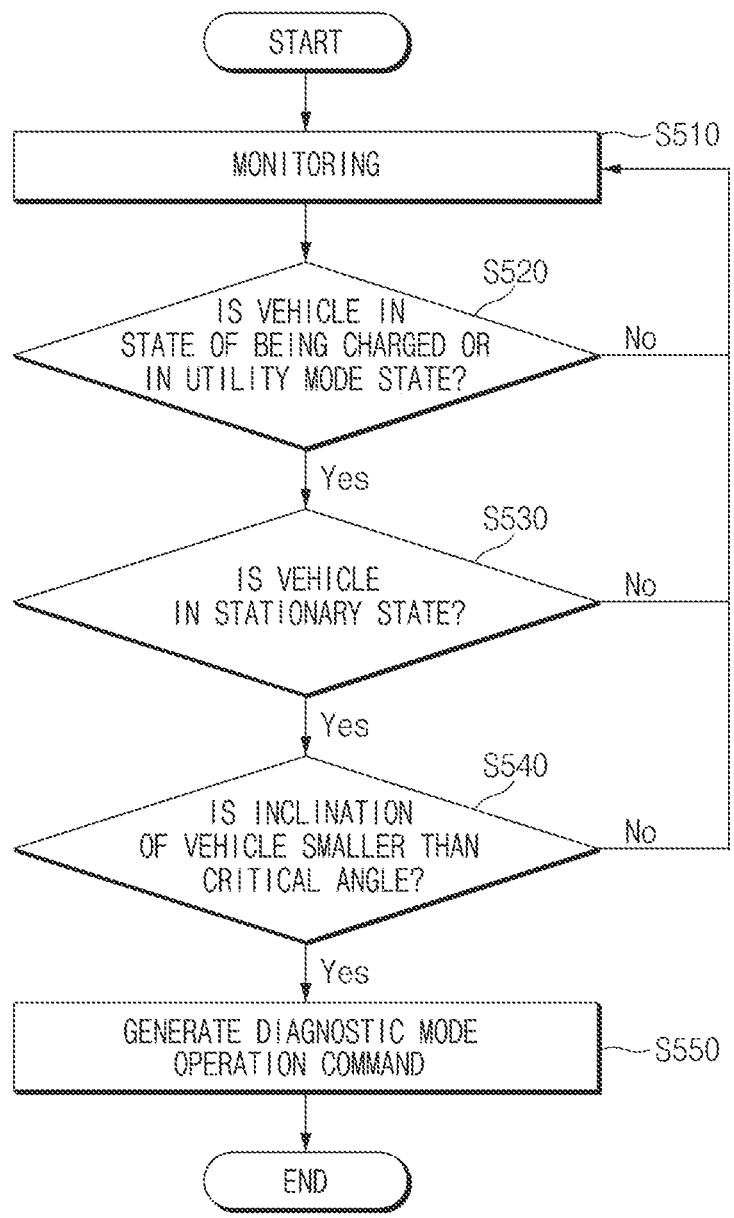
FIG. 5 is a flowchart illustrating a procedure for generating a diagnostic mode operation command according to an embodiment of the present disclosure.

FIG. 5 is a flowchart illustrating a procedure for generating a diagnostic mode operation command according to an embodiment of the present disclosure.

Referring to FIG. 5, in a first operation at S510 for generating the diagnostic mode operation command, the controller 200 may monitor a vehicle state based on the vehicle state information provided from the state information acquiring device 100. A procedure of monitoring the vehicle state may be an operation of determining whether the disturbance factor that will intervene in the process of calculating the RPM of the water pump 310 exists.

In a second operation at S520, the controller 200 may determine whether the vehicle is in the state of being charged or in the utility mode state based on the vehicle state information.

The controller 200 may receive the charging state information of the vehicle from the OBC state information acquiring device 110. The controller 200 may determine whether the vehicle is in the state of being charged based on the charging state information. In addition, the controller 200 may determine whether the vehicle is in the utility mode state based on the charging state information.

When the vehicle is in the state of being charged or in the utility mode state, the controller 200 may determine whether the vehicle is in the stationary state in a third operation S530.

The controller 200 may determine that the vehicle is in the stationary state based on that the speed of the vehicle provided from the vehicle speed determining device 120 is 0. In addition, when state information of the gear provided from the gear identifying device 130 is the "P stage", the controller 200 may determine that the vehicle is in the stationary state.

When the vehicle is in the stationary state, in a fourth operation S540, the controller 200 may determine whether the inclination of the vehicle is smaller than the threshold angle based on the vehicle state information.

The controller 200 may determine the inclination of the vehicle based on inclination information provided from the inclination determining device 140. The inclination information may be information obtained from the 3-axis acceleration sensor. The controller 200 may receive acceleration information from the 3-axis acceleration sensor, and determine the inclination of the vehicle based on the acceleration information. The inclination of the vehicle may refer to the angle between the ground and the straight line belonging to the bottom surface of the vehicle.

In a fifth operation at S550, the controller 200 may generate the diagnostic mode operation command based on the inclination of the vehicle being smaller than the threshold angle.

The embodiment shown in FIG. 5 describes the embodiment of generating the diagnostic mode operation command in the state in which all of the disturbance factors described in second operation S520 to fourth operation S540 are excluded, but a condition for determining the disturbance factor may be optional.

In addition, first operation S510 shown in FIG. 5 may further include an operation of identifying a temperature of the OBC 50. The OBC 50 may be cooled by the cooling system in the vehicle. Therefore, when the cooling system is abnormal, the temperature of the OBC 50 may not decrease in a state that has risen to a high temperature by the charging. The controller 200 may proceed with a procedure for diagnosing the abnormality of the cooling system based on the identification of the temperature of the OBC 50.

Figure 6:
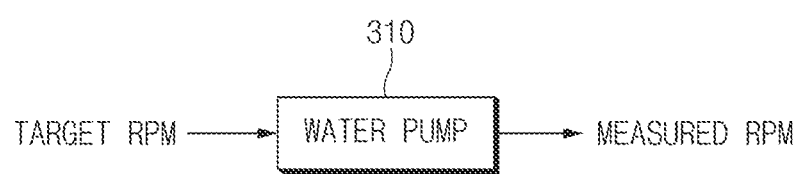
FIG. 6 is a diagram for illustrating water pump control based on a diagnostic mode operation command.

FIG. 6 is a diagram for illustrating water pump control based on a diagnostic mode operation command.

Referring to FIG. 6, the diagnostic mode operation command may control the water pump 310 in the open loop form. Accordingly, the water pump 310 may rotate in response to a target RPM input without a feedback operation.

The abnormal state determining device 230 of the controller 200 may determine that the cooling system is abnormal based on the measured RPM of the water pump 310 controlled in the open loop form.

Because the diagnostic mode operation command is generated in the state in which the disturbance factor is removed, and the feedback operation is removed by the diagnostic mode operation command, the abnormal state determining device 230 may more clearly determine whether the cooling system is abnormal based on the RPM of the water pump 310.

In addition, the controller 200 may control the low voltage DC-DC converter 320 to output the constant voltage.

Figure 7:
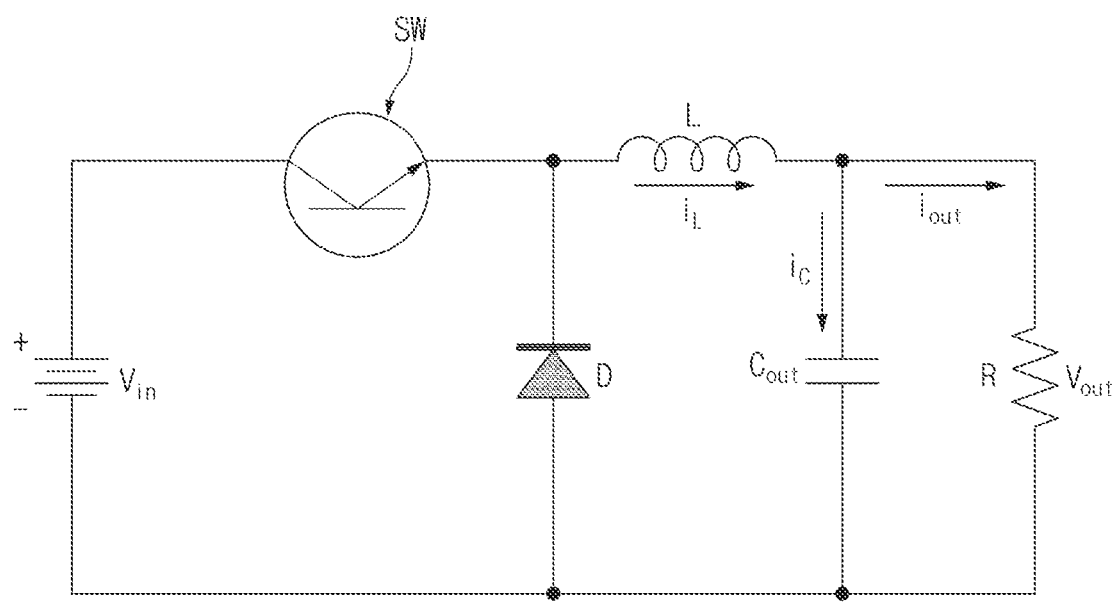
FIG. 7 is a diagram showing an embodiment of a low voltage DC-DC converter.

FIG. 7 is a diagram showing an embodiment of a low voltage DC-DC converter.

Referring to FIG. 7, the low voltage DC-DC converter 320 may be implemented as a buck converter. An output voltage of the low voltage DC-DC converter 320 may be provided as the input voltage of the water pump 310, and may be determined based on an input voltage Vin and an on-off duty ratio of a switch element SW. The input voltage Vin may correspond to the high voltage battery 60 shown in FIG. 2.

Because a voltage state of the high voltage battery 60 may change based on a vehicle load, when the duty ratio of the low voltage DC-DC converter 320 is fixed, an output voltage Vout may change. When the output voltage of the low voltage DC-DC converter 320 is changed, a driving voltage of the water pump 310 may be changed, and a current driving the water pump 310 may be changed. That is, the change in the output voltage of the low voltage DC-DC converter 320 may be a factor that may act as a variable in the RPM of the water pump 310.

Therefore, to control the low voltage DC-DC converter 320 to output the constant voltage, the controller 200 may monitor the voltage state of the high voltage battery 60, and control the duty ratio of the low voltage DC-DC converter 320 to correspond thereto. As such, by controlling the low voltage DC-DC converter 320 to output the constant voltage, the disturbance factor that may intervene in the process of calculating the RPM of the water pump 310 may be secondarily removed.

Figure 8:
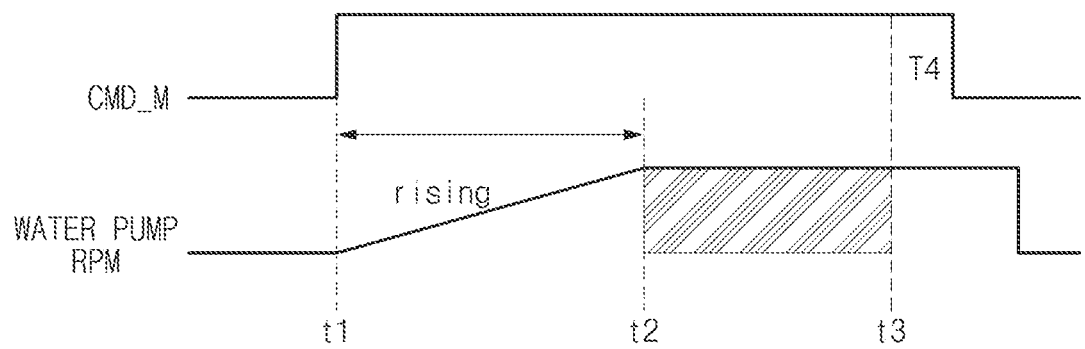
FIG. 8 is a diagram for illustrating a sequence of an abnormality diagnosis method of a cooling system according to an embodiment of the present disclosure.

FIG. 8 is a diagram for illustrating a sequence of an abnormality diagnosis method of a cooling system according to an embodiment of the present disclosure.

Referring to FIG. 8, at a first timing t1, the water pump 310 may rotate based on the diagnostic mode operation command CMD_M.

From the first timing t1 to a second timing t2, the RPM of the water pump 310 may increase.

From the second timing t2, the RPM of the water pump 310 may be maintained at a certain level.

The controller 200 may calculate the RPM of the water pump 310 after the second timing t2. In addition, the controller 200 may obtain an average value of RPMs of the water pump 310 acquired for a certain period after the second timing t2. That is, to increase reliability of the RPM of the water pump 310, the controller 200 may obtain RPMs respectively at a plurality of timings, and obtain an average value of the RPMs to calculate the RPM of the water pump 310.

Figure 9:
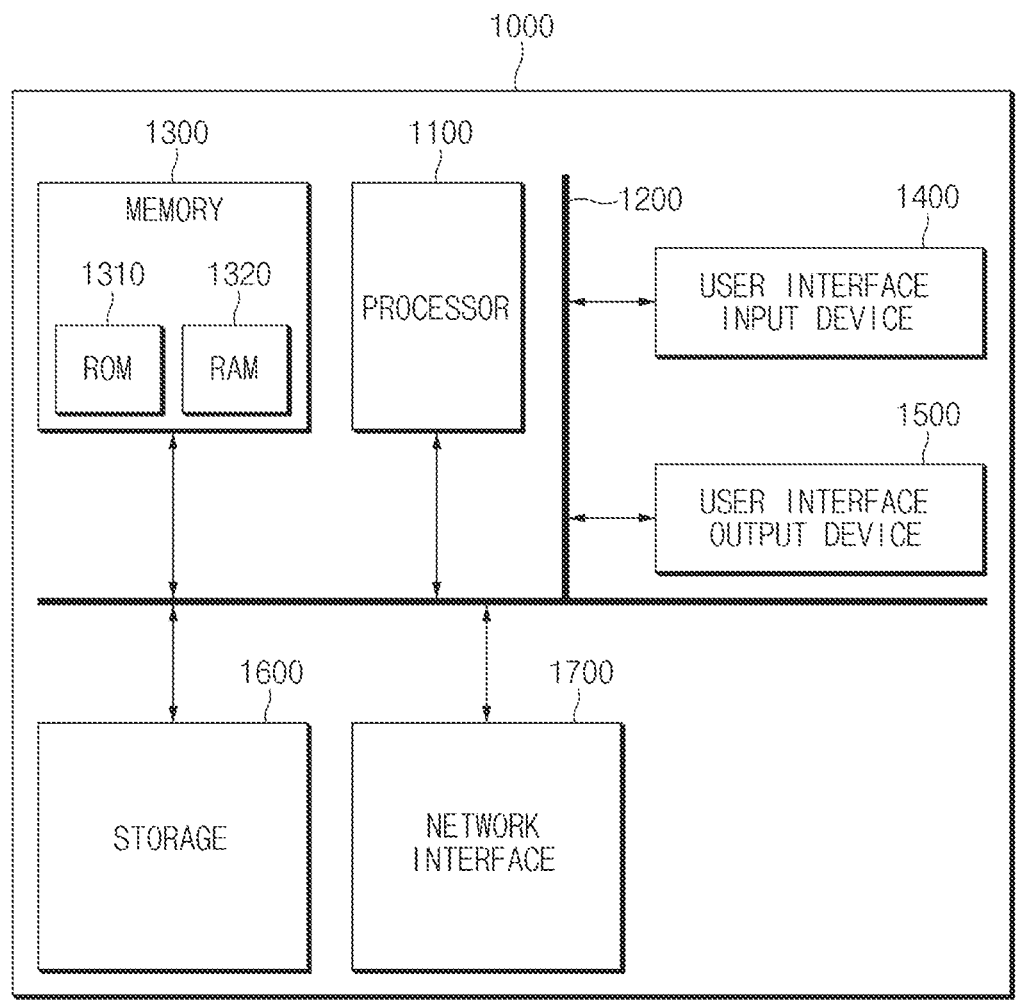
FIG. 9 is a diagram illustrating a computing system according to an embodiment of the present disclosure.

FIG. 9 is a diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The controller 200 according to an embodiment of the present disclosure may be a component of the processor 1100.

The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the embodiment of the present disclosure, because the abnormal state of the vehicle cooling system is determined without using the separate sensor, it is possible to reduce the volume occupied by the vehicle internal accessories and reduce the manufacturing cost.

In addition, various effects directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A method for diagnosing an abnormality of a vehicle cooling system using circulation of cooling water stored in a reservoir tank, the method comprising:
   generating, by a processor, a diagnostic mode operation command based on state information of a vehicle including a disturbance factor received from a sensor;
   determining, by the processor, an RPM of a water pump in response to the diagnostic mode operation command;

determining, by the processor, an abnormal state of the cooling system based on the RPM of the water pump being equal to or greater than a predetermined threshold; and notifying, by the processor, the abnormal state after determining the abnormal state of the cooling system through a display.

2. The method of claim 1, wherein the generating of the diagnostic mode operation command includes:

generating the diagnostic mode operation command based on identification of an on board charging system of the vehicle being in a charging state.

3. The method of claim 1, wherein the generating of the diagnostic mode operation command includes:

generating the diagnostic mode operation command based on a temperature of an on board charging system of the vehicle being equal to or higher than a threshold temperature.

4. The method of claim 1, wherein the generating of the diagnostic mode operation command includes:

generating the diagnostic mode operation command based on identification of a stationary state of the vehicle.

5. The method of claim 1, wherein the generating of the diagnostic mode operation command includes:

generating the diagnostic mode operation command based on an inclination of the vehicle being smaller than a threshold angle.

6. The method of claim 1, wherein the generating of the diagnostic mode operation command includes:

controlling a low voltage DC-DC converter of the vehicle to output a constant voltage during a period of calculating the RPM of the water pump.

7. The method of claim 1, wherein the calculating of the RPM of the water pump includes:

calculating an average value of RPMs calculated for a preset certain period after the RPM of the water pump reaches a certain RPM.

8. The method of claim 1, wherein the determining of the abnormal state of the cooling system includes:

determining that the cooling water of the reservoir tank is insufficient based on the RPM of the water pump being equal to or greater than a predetermined first threshold.

9. The method of claim 1, wherein the determining of the abnormal state of the cooling system includes:

determining that the circulation of the cooling water from the reservoir tank is abnormal based on the RPM of the water pump being equal to or greater than a predetermined second threshold.

10. A vehicle cooling system comprising:

a reservoir tank configured to store cooling water;

a water pump configured to circulate the cooling water;

a sensor configured to sense a physical quantity for determining the disturbance factor;

a display configured to show information on the abnormal state of the cooling system; and a processor configured to:

generate a diagnostic mode operation command based on state information of a vehicle including a disturbance factor;

determine an RPM of the water pump in response to the diagnostic mode operation command;

determine an abnormal state based on the RPM of the water pump being equal to or greater than a predetermined threshold; and control the display to show information on the abnormal state after determining the abnormal state of the cooling system.

11. The vehicle cooling system of claim 10, wherein the processor is configured to generate the diagnostic mode operation command based on identification of an on board charging system of the vehicle being in a charging state.

12. The vehicle cooling system of claim 10, wherein the processor is configured to generate the diagnostic mode operation command based on a temperature of an on board charging system of the vehicle being equal to or higher than a threshold temperature.

13. The vehicle cooling system of claim 10, wherein the processor is configured to generate the diagnostic mode operation command based on identification of a stationary state of the vehicle.

14. The vehicle cooling system of claim 10, wherein the processor is configured to generate the diagnostic mode operation command based on an inclination of the vehicle being smaller than a threshold angle.

15. The vehicle cooling system of claim 10, wherein the processor is configured to control a low voltage DC-DC converter of the vehicle to output a constant voltage during a period of calculating the RPM of the water pump.

16. The vehicle cooling system of claim 10, wherein the processor is configured to calculate an average value of RPMs calculated for a preset certain period after the RPM of the water pump reaches a certain RPM.

17. The vehicle cooling system of claim 10, wherein the processor is configured to determine that the cooling water of the reservoir tank is insufficient based on the RPM of the water pump being equal to or greater than a predetermined first threshold.

18. The vehicle cooling system of claim 10, wherein the processor is configured to determine that the circulation of the cooling water from the reservoir tank is abnormal based on the RPM of the water pump being equal to or greater than a predetermined second threshold.

* * * * *